G. HUNZIKER.
MILLING MACHINE.
APPLICATION FILED JULY 9, 1918.
1,364,933.
Patented Jan. 11, 1921.
2 SHEETS—SHEET 1.
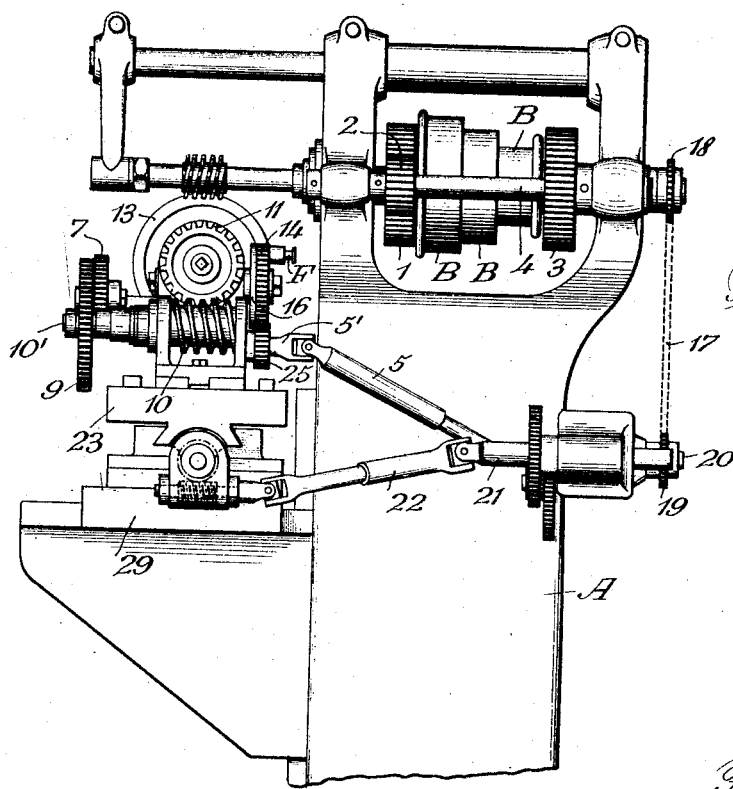
Fig. 1
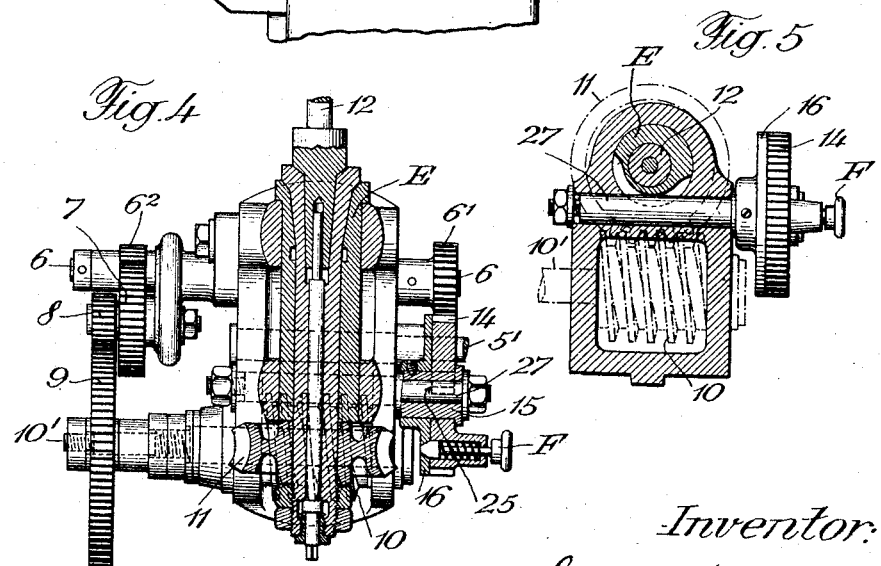
Fig. 4
Fig. 5
Inventor:
Gottlieb Hunziker,
By [signature]
Atty.

G. HUNZIKER.
MILLING MACHINE.
APPLICATION FILED JULY 9, 1918.
1,364,933.
Patented Jan. 11, 1921.
2 SHEETS—SHEET 2.
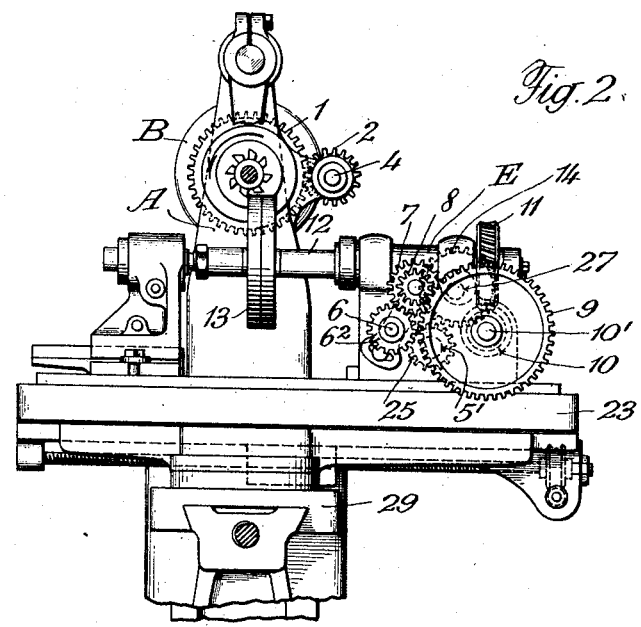
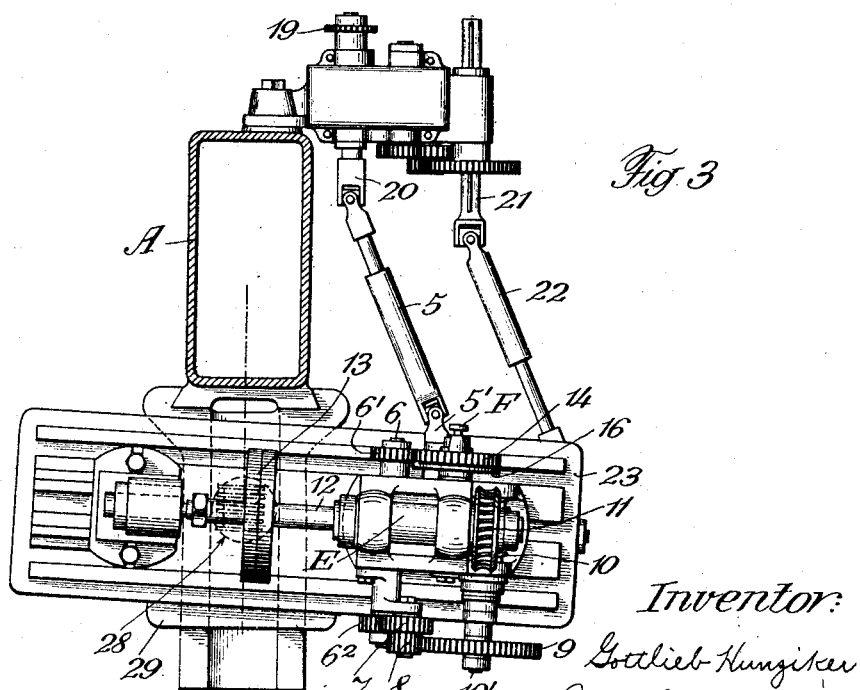
Inventor:
Gottlieb Hunziker
By Henry Orth Jr
Atty.

UNITED STATES PATENT OFFICE.

GOTTLIEB HUNZIKER, OF RUTI, ZURICH, SWITZERLAND.

MILLING-MACHINE.

1,364,933. Specification of Letters Patent. Patented Jan. 11, 1921.

Application filed July 9, 1918. Serial No. 244,104.

*To all whom it may concern:*

Be it known that I, GOTTLIEB HUNZIKER, a citizen of the Republic of Switzerland, residing at Ruti, Zurich, Switzerland, have invented certain new and useful Improvements in Milling-Machines; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

The present invention relates to gear cutting attachments for milling machines, and it relates particularly to attachments for use in connection with milling machines provided with a longitudinally movable bed or slide, which bed or slide should also be rotatable in a horizontal plane.

The attachment comprises a head stock arranged for mounting on the bed or slide of the milling machine, there being a detachable, articulated, extensible shaft connecting the head to one of the shafts of the gear train for feeding the slide of the milling machine.

The indexing may be continuous, as for cutting with a hob, or may be step-by-step, as for cutting with a formed disk cutter.

Other novel details of construction will be pointed out in the following description and claims.

Referring to the drawings in which like parts are similarly designated—

Figure 1 represents a fragmentary front view of a milling machine provided with my improved attachment.

Fig. 2 is a side elevation, and

Fig. 3 is a plan thereof.

Figs. 4 and 5 illustrate detail parts, partly in section and on a larger scale.

In the milling machine A is journaled the main drive shaft with its step pulleys B by means of which the spur wheel 3 on the intermediate shaft 4 is driven said intermediate shaft carrying a pinion 2 that drives the gear wheel 1 connected to the spindle of the milling machine.

The sprocket wheel 18 on the main shaft is connected by a chain 17 to a sprocket wheel 19 which drives a speed changing train of gears and shafts, of which the shaft 21 is connected by an articulated extensible shaft 22 to the feed mechanism of the longitudinal slide 23. The bed of this slide is rotatably mounted by means of a stud 28, Fig. 3, in a transverse slide 29.

The foregoing mechanism is common to a number of types of milling machines, and it is to similar milling machines that my attachment is to be applied.

On the slide 23 I mount any suitable tail stock and then place on the slide the head stock embodying my invention.

This head stock comprises a frame that has a main driving shaft 5' which transmits its rotary motion through a speed reducing train of gears, which comprises the spur wheels 25 and 6', the shaft 6, the wheel $6^2$, and the wheels 7 and 8, to the spur wheel 9 fast on the shaft 10'. A worm 10, likewise fixed on this shaft 10', meshes with the worm wheel 11, which is fixed on a shaft journaled coaxially with the main spindle 12 carrying the work piece gear wheel blank 13. The shaft of the worm wheel 11 is journaled eccentrically within the sleeve E, while the latter is arranged centrically within the spindle support.

The main shaft 5' of the head stock is connected by an extensible, articulated shaft 5 to one of the shafts 20 of the speed changing train of the milling machine.

An eccentric sleeve 15 (Fig. 4) is rigidly secured on a stationary shaft 27, and a toothed hand indexing wheel 14 is loosely arranged on this sleeve concentrically therewith. To the sleeve 15 is further fixed a concentric indexing disk 16, which by means of the hand pin coupling F can be coupled with the toothed wheel 14.

The operation of the described mechanism is as follows:

If, for instance, spur wheels are to be cut out by means of a formed disk milling cutter, the articulated shaft 5 is first disconnected at both ends, the longitudinal slide is adjusted exactly at an angle of 90° to the milling machine spindle, and the toothed wheel 14 is operatively connected with the wheel 25 and thus with the shaft 5' by coupling the manual indexing wheel 14 by the hand coupling F with the disk 16 and then turning it by hand together with the sleeve 15 and the shaft 17 until, by reason of the eccentricity of the sleeve 15 the two wheels 14 and 25 mesh. The wheel 14 is then turned once about its supporting sleeve 15, after the pin coupling F has been released, with the result that by the train of gears the spindle 12 is advanced for each complete revolution of the wheel 14 to the extent of the circular pitch.

If, on the other hand, teeth are to be cut according to the development method or helical milling process by means of helical hobs, then the articulated shaft 5 is to be connected after the indexing wheel 14 has been disconnected from the wheel 25. The shaft 5 then transmits the drive continuously over the transmission mechanism 25, 6', 6, 6², 7, 8, 9, 10' 10 to the worm wheel 11. The longitudinal slide is connected for traverse in a longitudinal direction, that is to say, crosswise of the cutter spindle to provide the feed.

When milling out worm wheels the feed of the work piece takes place in a vertical direction by the usual vertical feed on the milling machine.

The adjustability of the worm wheel 11, eccentrically journaled in the sleeve E permits movement of the main spindle 12 relatively to the driving worm 10, to take up the wear between the wheel 11 and worm 10 and effectively remedy the annoyances of the side play of the operative parts, which is caused by the wearing down of the respective contacting surfaces, and an exact coöperation of the parts is assured.

It will be seen that by an attachment in the nature of a head-stock adaptable to any milling machine having a speed changing train of gears and shafts, the milling machine can be converted into a gear cutting machine for cutting any style of gear desired, it being simply necessary to provide an additional shaft 5 and connect it to one of change speed gear train shafts, as 20, of the milling machine.

I claim:

1. A gear cutting attachment for milling machines having a main spindle, a longitudinally movable bed, speed changing gearing and shafts, and a shaft driven by said gearing and shafts for feeding the bed; in combination with a head stock having gear blank indexing mechanism for indexing the blank beneath the main spindle of the milling machine and an extensible articulated shaft between one of the shafts for the table feed gearing and the indexing mechanism.

2. A gear cutting attachment for milling machines having a main spindle, a longitudinally movable, horizontally rotatable and vertically adjustable bed, speed changing gearing and shafts and a shaft driven by said gearing and shafts for feeding the bed; in combination with a head stock having gear blank indexing mechanism for indexing the blank beneath the main spindle of the milling machine, and an articulated extensible shaft between one of the shafts of the table feed gearing and the indexing mechanism.

3. A head stock attachment for milling machines, comprising a frame, a main shaft therein, a work spindle, an indexing mechanism on said frame for said spindle and means mounted on the frame operable when the driving connection for said indexing mechanism is disconnected to manually index said spindle.

4. A gear cutting head stock attachment for milling machines comprising a frame, a work spindle mounted therein, a worm wheel thereon, a worm mounted at right angles to the spindle to drive said worm wheel, speed reducing gearing on the frame, a driving connection for said gearing and means on the frame for operating said gearing manually when the driving connection is disconnected.

In testimony that I claim the foregoing as my invention, I have signed my name.

GOTTLIEB HUNZIKER.